(12) United States Patent
Klaffmo et al.

(10) Patent No.: US 9,265,978 B2
(45) Date of Patent: Feb. 23, 2016

(54) FLAME RETARDANT AND FIRE EXTINGUISHING PRODUCT FOR FIRES IN LIQUIDS

(71) Applicant: Miraculum Applications, Inc., Austin, TX (US)

(72) Inventors: Freddy Kai Klaffmo, Arbrå (SE); Britt Ann-Christine Langselius, Austin, TX (US)

(73) Assignee: MIRACULUM APPLICATIONS, INC., Austin, TX (US)

( * ) Notice: Subject to any disclaimer, the term of this patent is extended or adjusted under 35 U.S.C. 154(b) by 0 days.

(21) Appl. No.: 14/806,606

(22) Filed: Jul. 22, 2015

(65) Prior Publication Data

US 2015/0335926 A1  Nov. 26, 2015

Related U.S. Application Data

(60) Continuation-in-part of application No. 14/481,940, filed on Sep. 10, 2014, which is a division of application No. 14/295,318, filed on Jun. 3, 2014, now abandoned, which is a continuation of application No. 14/161,678, filed on Jan. 22, 2014.

(60) Provisional application No. 61/755,043, filed on Jan. 22, 2013.

(51) Int. Cl.
| | |
|---|---|
| A62D 1/00 | (2006.01) |
| C09K 21/02 | (2006.01) |
| C09K 21/04 | (2006.01) |
| C09K 21/14 | (2006.01) |
| A62C 5/00 | (2006.01) |
| A62D 1/02 | (2006.01) |

(52) U.S. Cl.
CPC ............... *A62C 5/008* (2013.01); *A62D 1/005* (2013.01); *A62D 1/0035* (2013.01); *A62D 1/0042* (2013.01); *A62D 1/0071* (2013.01); *C09K 21/02* (2013.01); *C09K 21/04* (2013.01); *C09K 21/14* (2013.01)

(58) Field of Classification Search
None
See application file for complete search history.

(56) References Cited

U.S. PATENT DOCUMENTS

| | | | | |
|---|---|---|---|---|
| 2,262,634 | A | * 11/1941 | Cobbs | 106/18.14 |
| 3,245,904 | A | * 4/1966 | Young | 252/7 |
| 3,562,197 | A | * 2/1971 | Sears | 524/415 |
| 4,610,311 | A | 9/1986 | Bronner et al. | |
| 4,839,065 | A | * 6/1989 | Vandersall | 252/603 |
| 4,871,477 | A | 10/1989 | Dimanshteyn | |
| 4,971,728 | A | 11/1990 | Vandersall | |
| 4,983,326 | A | 1/1991 | Vandersall et al. | |
| 5,091,097 | A | * 2/1992 | Pennartz | 252/7 |
| 5,393,437 | A | 2/1995 | Bower | |
| 5,425,426 | A | 6/1995 | Baratov et al. | |
| 5,518,638 | A | * 5/1996 | Buil et al. | 252/2 |
| 5,833,874 | A | 11/1998 | Stewart et al. | |
| 6,015,838 | A | * 1/2000 | Stern et al. | 516/12 |
| 6,322,726 | B1 | * 11/2001 | Vandersall et al. | 252/601 |
| 6,379,578 | B1 | 4/2002 | Shiga | |
| 6,447,697 | B1 | * 9/2002 | Vandersall | 252/301.35 |
| 6,652,633 | B2 | 11/2003 | Pasek et al. | |
| 6,802,994 | B1 | 10/2004 | Kegeler et al. | |
| 6,905,639 | B2 | 6/2005 | Vandersall et al. | |
| 7,135,125 | B2 | * 11/2006 | Clark | 252/3 |
| 7,381,696 | B2 | * 6/2008 | Hubert et al. | 510/473 |
| 8,080,169 | B2 | 12/2011 | Kariya | |
| 8,080,186 | B1 | * 12/2011 | Pennartz | 252/601 |
| 8,778,213 | B2 | 7/2014 | Guo et al. | |
| 2002/0013403 | A1 | * 1/2002 | Vandersall | 524/547 |
| 2002/0100897 | A1 | * 8/2002 | Vandersall et al. | 252/601 |
| 2003/0212177 | A1 | * 11/2003 | Vandersall et al. | 524/416 |
| 2005/0001197 | A1 | * 1/2005 | Clark | 252/3 |
| 2009/0096668 | A1 | * 4/2009 | Chen | 342/357.12 |
| 2010/0069488 | A1 | 3/2010 | Mabey et al. | |
| 2012/0292551 | A1 | 11/2012 | Klaffmo | |
| 2013/0180738 | A1 | * 7/2013 | Kim et al. | 169/45 |
| 2014/0202716 | A1 | * 7/2014 | Klaffmo et al. | 169/45 |
| 2014/0202717 | A1 | * 7/2014 | Klaffmo et al. | 169/45 |

(Continued)

FOREIGN PATENT DOCUMENTS

| | | |
|---|---|---|
| EP | 0212017 B1 | 1/1990 |
| EP | 0848627 B1 | 11/2002 |
| WO | 2012071577 A2 | 5/2012 |

OTHER PUBLICATIONS

Magma Firestop SBP-1. Safety Data Sheet. AD Productions BV, 2009.

(Continued)

*Primary Examiner* — Joseph D Anthony

(74) *Attorney, Agent, or Firm* — Foley Hoag LLP

(57) ABSTRACT

A novel flame retardant and fire extinguishing product for preventing and fighting fires in liquids is disclosed herein. The product comprises water, one or more flame retardants, one or more polymers, one or more surfactants, one or more emulsifiers, one or more preservatives, and one or more firming agents. In some embodiments, the product may further comprise one or more stabilizers, one or more binders, and/or one or more fining agents. The product may be used as a fire extinguishing agent in active firefighting and as a flame retardant to prevent fires. The product may be biodegradable in a natural environment, may be readily cleaned off equipment and materials to which it has been applied using water, and may also provide other features which render it safe for the environment as compared to other commonly used products in fire prevention and firefighting.

21 Claims, No Drawings

(56) References Cited

U.S. PATENT DOCUMENTS

2014/0284067 A1\* 9/2014 Klaffmo et al. .................. 169/45
2014/0284512 A1\* 9/2014 Klaffmo et al. .............. 252/8.05

OTHER PUBLICATIONS

Magma Firestop TG-3. Safety Data Sheet. Fiber ProTector Norge AS, 2012.
Magma Firestop IMW-435. Safety Data Sheet. AD Productions BV, 2009.
Magma Firestop IMK-433. Safety Data Sheet. Magma Industries B.V., 2012.
Magma Firestop SG-2H. Safety Data Sheet. Magma Industries B.V., 2012.
Magma Firesheen. Safety Data Sheet. Magma Industries B.V., 2014.
Magma X-Mas Safe. Safety Data Sheet. Magma Industries B.V., 2012.
Magma Firestop IMA-120. Safety Data Sheet, AD Productions BV, 2009.

\* cited by examiner

FLAME RETARDANT AND FIRE EXTINGUISHING PRODUCT FOR FIRES IN LIQUIDS

CROSS-REFERENCE TO RELATED APPLICATIONS

This application is a continuation in part of U.S. Non-Provisional patent application Ser. No. 14/481,940, which is a divisional of U.S. Non-Provisional patent application Ser. No. 14/295,318, filed on Jun. 3, 2014, which is a continuation of U.S. Non-Provisional patent application Ser. No. 14/161,678, filed on Jan. 22, 2014, which claims priority to U.S. Provisional Patent Appl. No. 61/755,043, filed on Jan. 22, 2013, the disclosures of which are incorporated herein in their entireties by reference.

BACKGROUND

1. Field of the Invention

The present disclosure describes a novel flame retardant and fire extinguishing product for preventing and fighting fires in liquids.

2. Description of the Related Art

There are two general methods of reducing the potential damage from the burning of combustible materials—preventive treatment and active firefighting. Preventive treatment with a flame retardant may reduce the flammability of a material. Once a material begins to burn, the fire may be extinguished with an appropriate mix of fire retardants and fire extinguishing agents in liquid, solid, or gaseous form.

The use of flame retardants not only reduces the risk of a fire starting but also hinders its propagation. This increases the available time to escape from the damage and thus protects humans, property, and the environment.

An ideal flame retardant or fire extinguishing agent will have the following properties: (1) it will significantly reduce the flammability of the materials to which it is applied; (2) it will significantly reduce the risk of re-ignition after a material to which it is applied is exposed to fire conditions; (3) it will be non-toxic to humans, animals, and plants; (4) it will be biodegradable or at least not harmful to the environment; (5) it will not cause the release of toxic or corrosive substances under extreme fire conditions; (6) it will not migrate from the materials to which it is applied via evaporation or other forms of release; (7) it will not negatively affect the recyclability of materials to which it is applied; and (8) its production, processing, application, and disposal or recycling will not cause significant environmental harms.

Numerous fire extinguishing agents are available for actively fighting fires in liquids. A limited number of available agents may also be used preventatively to increase the fire resistance of liquids. Various shortcomings of currently available agents for retarding and fighting fires in liquids are described hereinafter.

Currently available fire extinguishing agents used to fight fires in liquids present several shortcomings: (1) secondary damage caused by use of the fire extinguishing agent; (2) re-ignition risks; (3) short-term or long-term toxicity and environmental damage; and (4) lack of general utility based on limitation to use for specific types of fires.

Water, the most common fire extinguishing agent for extinguishing fires in solid materials, cannot be used to extinguish fires in many liquids. When water is applied to a burning liquid that is immiscible with water, the less dense of the two liquids will form the top layer. Many common flammable liquids such as gasoline, kerosene, and many oils are both immiscible with and less dense than water. If water is applied to a burning liquid with these properties, the burning liquid will form the top layer. The water will then be heated by the burning liquid to form steam, and then it will cause the burning liquid to be sprayed in all directions and thereby cause the fire to spread. To use water to extinguish a fire in a burning liquid with these properties, it must be mixed with a foam-forming material or another similar substance. Even when water can be used to extinguish a fire in a liquid, it presents shortcomings. Using water creates the risk of vapor explosion when fighting fires in enclosed spaces due to the presence of high temperature steam. Using water to fight a fire in a liquid may also result in contamination of large amounts of water with pollutants, which will then be spread into the environment.

Carbon dioxide is an effective fire extinguishing agent for certain types of fires. It does not leave any residue and is relatively inert. However, toxic concentrations of carbon dioxide are generally required to fight large fires. In addition, carbon dioxide dissipates rapidly and thus it is not an effective agent for smoldering fires or preventing re-ignition. It can also damage certain electronics.

A variety of foams also are used to fight fires in liquids. Fire extinguishing foams are generally used to cool fires and to coat burning liquids to prevent contact with oxygen, thereby suppressing combustion. The type of foam used to fight a specific fire depends on various factors, including the size of the area affected by fire, whether the affected area is an enclosed or open space, and the properties of the burning liquid(s). Specialized foams are used to fight fires in liquids comprising oxygenates and polar liquids, as such liquids may degrade many fire extinguishing foams not specifically designed to be inert to such liquids. These specialized foams are often described as alcohol-resistant foams.[1] Ethanol fires typically require highly specialized foams which are correspondingly very expensive.

[1] See, e.g., http://www.fomtec.com/foam/category33.html

Many foams used to fight fires in liquids are toxic, generate toxic byproducts, or are otherwise harmful to the environment.[2] Non-toxic alternatives generally are restricted in their uses, have a limited lifespan, or present other shortcomings. The use of foams often requires expensive clean-up operations after completing the firefighting. The foam often must be applied so as to achieve full coverage of the ignited materials to effectively extinguish the fire. Many foams are limited to use for fighting only specific types of fires. Moreover, fire extinguishing foams are often non-adhesive to many liquids, and thus the foam may be blown off the previously covered liquid by wind or be dispersed by the natural flow of the liquid, leading to re-ignition. Preventing re-ignition of extinguished surfaces will reduce the response times when a fire occurs, reduce risks to firefighters, increase opportunities to save lives endangered by fire, and increase opportunities to protect property at risk for damage or destruction by fire.

[2] http://www.haifire.com/Resources/publications/Environmental_Impacts_of_Firefighting_Foams.pdf Most of the currently available agents for fighting fires in liquids can only extinguish fires and cannot be used for preventative treatment. Many available agents are toxic, generate toxic byproducts, or are otherwise harmful to the environment. In addition, many available agents are specialized and can only be used to fight certain types of fires. Ethanol fires are particularly difficult to extinguish using currently developed fire extinguishing agents in common use, and often require highly specialized fire extinguishing agents developed specifically for ethanol fires. Re-ignition is also a significant problem not adequately addressed by currently available fire extinguishing agents.

While some fire extinguishing agents, such as certain types of fire extinguishing foams, can also be used preventatively to retard fires in liquids in certain circumstances, these uses present the same shortcomings as use of the same agents in active firefighting.

Thus there remains a need for environmentally safe, effective flame retarding and fire extinguishing agents which can be used to prevent and fight a variety of types of fires in liquids and which effectively prevent re-ignition upon use.

SUMMARY

A novel flame retardant and fire extinguishing product for preventing and fighting fires in liquids is disclosed herein. The product comprises water, one or more flame retardants, one or more polymers, one or more surfactants, one or more emulsifiers, one or more preservatives, and one or more firming agents. In some embodiments, the product may further comprise one or more stabilizers, one or more binders, and/or one or more fining agents. The product may be used as a fire extinguishing agent in active firefighting and as a flame retardant to prevent fires. The product may be biodegradable in a natural environment, may be readily cleaned off equipment and materials to which it has been applied using water, and may also provide other features which render it safe for the environment as compared to other commonly used products in fire prevention and firefighting.

DETAILED DESCRIPTION OF THE PREFERRED EMBODIMENTS

The present disclosure describes a novel flame retardant and fire extinguishing product for preventing and fighting fires in liquids. The product comprises water, one or more flame retardants, one or more polymers, one or more surfactants, one or more emulsifiers, one or more preservatives, and one or more firming agents. In some embodiments, the product may further comprise one or more stabilizers, one or more binders, and/or one or more fining agents.

In some embodiments, the product may be used in active firefighting. The product may be used to extinguish active fires by applying it to a liquid affected by fire.

In other embodiments, the product may be used as a flame retardant to prevent fires. The product may be applied to a liquid to render the liquid fire-resistant. The product may adhere to a variety of liquids, including but not limited to hydrocarbons such as oil, gasoline, kerosene, and diesel and polar liquids such as ethanol and E85. Use of the product as a flame retardant will contaminate the surface layer of the liquid to which it is applied to the depth of penetration of the product into the liquid, as described hereinafter.

In some embodiments, the product may be used to protect liquids near an active fire to prevent the fire from spreading to those liquids.

The product may be sprayed from a nozzle as an aqueous solution or suspension. The product will bind to the surface layer of the liquid. The product may penetrate into the liquid a short distance but will not substantially disperse throughout the liquid. The bound product may form a layer of protection against ignition or re-ignition of the material and thus may be effective in limiting the spread of a fire to adjoining areas. The product may bind to the surface of a variety of liquids, including but not limited to hydrocarbons such as oil, gasoline, diesel, and kerosene and polar liquids such as E85 and ethanol.

In some embodiments, the product will be sprayed on an active fire using a nozzle. In preferred embodiments, the distance from the nozzle to the burning liquid will be greater than the typical distance between a nozzle used to apply foam onto a fire and the burning liquid. This will allow firefighters to maintain a greater distance from burning liquid than the distance that would be possible when foam is used to fight a fire. The increased distance will increase safety for the firefighters. It will also allow firefighting further into the affected area.

In some embodiments, the product may penetrate slightly into a liquid to which it is applied. In preferred embodiments, the product penetrates into the liquid to which it is applied to a depth of approximately 0.01 to 5 centimeters.

In preferred embodiments, the product may be stable under ordinary conditions for long-term storage. In preferred embodiments, the product may be mold and fungus resistant.

In preferred embodiments, the product may provide cooling effects to reduce the temperature of liquids affected by fire. In some embodiments, cooling effects may be provided by increased heat absorption capacity of liquids treated with the product. In some embodiments, cooling effects may be provided by absorption or trapping of hot flammable gases. In some embodiments, cooling effects may be provided by preventing flammable gases from contacting oxygen. In some embodiments, cooling effects may be provided by rapidly extinguishing an active fire.

In some embodiments, the product may be used to extinguish fires in liquids, including but not limited to oil, gasoline, kerosene, diesel or other hydrocarbon fires in or around airports, oil refineries, or gas stations, at sea, or anywhere liquid storage tanks are present.

In some embodiments, the product may be used in small firefighting equipment such as handheld fire extinguishers and small firefighting equipment for fire trucks. In other embodiments, the product may be used in light and heavy ground-based firefighting equipment and in aerial firefighting equipment such as equipment used by firefighting helicopters and aircraft.

In preferred embodiments, the product may be biodegradable in a natural environment. The product may be an aqueous solution or suspension and may comprise water, inorganic phosphates, sulfates, and ammonium chloride. The product may be free of sources of brominated heavy metals and other heavy metals. In preferred embodiments, the product may also be free of alkyd phosphates and bromides. In preferred embodiments, the product may provide excellent fire prevention or firefighting properties when distributed as a mist to minimize the amount of product used. A reduced amount of product needed for firefighting may reduce storage and transportation needs for a firefighting operation. In preferred embodiments, the product may be readily cleaned off equipment, tools, and materials to which it has been applied using water. These features may render the product safe for the environment as compared to other commonly used fire prevention and firefighting products.

Use of the product may reduce the costs of extinguishing fires and post-fire remediation and restoration. Use of the product may result in less property damage than if water is used to extinguish fires and may result in reduced cleanup efforts required than if fire extinguishing foams are used. Moreover, by significantly reducing the risk of re-ignition, use of the product may reduce the number of personnel and amount of firefighting materials and supplies required to ensure an extinguished fire remains extinguished.

In some embodiments, the product may be used to create fire breaks when fighting fires by utilizing its flame retardant properties. This method may be applied to firefighting in a variety of situations, including but not limited to firefighting at sea, firefighting in buildings and critical infrastructure, firefighting at refineries and other facilities where large quantities of flammable liquids are present, and fighting forest fires. By creating fire breaks while fighting a fire, it is possible to protect adjacent buildings, infrastructure, ships, land, and other possible objects and areas to which the fire could spread. In addition, by applying the product to adjacent objects and areas, spread of the fire can be prevented even if the fire breaks are otherwise unsuccessful.

Preventing re-ignition of an extinguished fire will allow rescue personnel to enter an area affected by fire more quickly, as danger to the rescue personnel will be greatly reduced. This increases the opportunities to save the lives of individuals who may have otherwise perished in the fire. For example, a rescue vessel will be able to readily access an affected area in a fire at sea if the threat of re-ignition of the area is minimal, whereas the vessel will have to otherwise take significant precautions before entering the area if the threat of re-ignition is significant.

Moreover, preventing flare ups due to re-ignition may also be costly and time consuming, as it requires access to personnel and firefighting materials and supplies for a long period of time. By dramatically reducing the risk of re-ignition, use of the product to extinguish fires significantly reduces the number of personnel and amount of firefighting materials and supplies required to ensure the extinguished fire remains extinguished.

Product Description

The product comprises water, one or more flame retardants, one or more polymers, one or more surfactants, one or more emulsifiers, one or more preservatives, and one or more firming agents. In some embodiments, the product may further comprise one or more stabilizers, one or more binders, and/or one or more fining agents.

In preferred embodiments, the polymers reduce surface tension, inhibit evaporation, and enable the product to penetrate slightly into the liquid to which it is applied. In preferred embodiments, the surfactant promotes adhesion of the product to the surface of the liquid to which it is applied. In preferred embodiments, the emulsifier facilitates the formation of emulsions during and after production of the product. In preferred embodiments, the stabilizer prevents the product from separating into its components when stored in a sealed container. In preferred embodiments, the binder further prevents the product from separating into its various components. In preferred embodiments, the fining agent further stabilizes the product and further facilitates creation of an emulsion. In preferred embodiments, the preservative retards decomposition of the product. In preferred embodiments, the firming agent further promotes adhesion of the product to the surface of the liquid to which it is applied.

In some embodiments, the flame retardant comprises one or more ammonium salts, one or more nitrogen-containing compounds such as fertilizers, one or more phosphates, and one or more sulfates. In preferred embodiments, the ammonium salt comprises ammonium chloride. In some preferred embodiments, the phosphates comprise one or more organic ammonium phosphates. In other preferred embodiments, the phosphates comprise aluminum phosphate. In highly preferred embodiments, the phosphates comprise one or more organic ammonium phosphates and aluminum phosphate. In preferred embodiments, the sulfates comprise inorganic sulfates.

In preferred embodiments, the ammonium chloride comprises between about 10-15% of the flame retardant powder. In preferred embodiments, the one or more organic ammonium phosphates comprise between about 10-15% of the flame retardant powder. In preferred embodiments, the nitrogen-containing compounds comprise between about 25-55% of the flame retardant powder. In preferred embodiments, the aluminum phosphate comprises between about 10-15% of the flame retardant powder. In preferred embodiments, the sulfates comprise between about 10-15% of the flame retardant powder.

In preferred embodiments, the flame retardant powder comprises between 12-20% of the product. In highly preferred embodiments, the flame retardant powder comprises between 12-15% of the product.

In preferred embodiments, the polymers comprise between 0.01% and 1.6% of the product.

In preferred embodiments, the surfactant comprises one or more ingredients selected from the group consisting of anionic tensides, methylchlorothiazoline, bromonitropropane, and 2-bromo-2-nitropropane-1,3-diol. In highly preferred embodiments, the surfactant comprises between 0.05% and 0.45% of the product.

In preferred embodiments, the emulsifier comprises one or more ingredients selected from the group consisting of low viscosity oils and surfactants. In more preferred embodiments, the emulsifier comprises one or more low viscosity oils. In highly preferred embodiments, the emulsifier comprises between 0.1% and 1.2% of the product.

In preferred embodiments, the preservative comprises one or more ingredients selected from the group consisting of niacin, tetraalkyl ammonium chlorides, alkyl benzyl dimethyl ammonium chloride, benzalkonium chloride, isothiazolinones, acetic acid, and benzoic acid. In some embodiments, the tetraalkyl ammonium chloride may comprise one or more compounds selected from the group consisting of dioctyl dimethyl ammonium chloride, didecyl dimethyl ammonium chloride, and octyl decyl dimethyl ammonium chloride. In some embodiments, the isothiazolinone may comprise one or more compounds selected from the group consisting of methylisothiazolinone and chloromethyl-isothiazolinone. In preferred embodiments, the preservative comprises between 0.04% and 1.05% of the product.

In preferred embodiments, the firming agent comprises one or more ingredients selected from the group consisting of glycerol, fatty acids, and low viscosity oils. In highly preferred embodiments, the firming agent comprises between 0.2% and 0.9% of the product.

In some embodiments, the product may further comprise one or more stabilizers. In preferred embodiments, the stabilizer comprises one or more ingredients selected from the group consisting of alginates, guar gum, sodium phosphates, potassium phosphates, natural rubber, locust bean gum, guar gum, tragacanth, xanthan gum, karaya gum, tara gum, gellan gum, soybean hemicellulose, pectin, polyethylene glycol, polyoxyethylene (40) stearate, polyoxyethylene-20-sorbitan monolaurate, polyoxyethylene-20-sorbitan monooleate, polyoxyethylene-20-sorbitan monopalmitate, polyoxyethylene-20-sorbitan monostearate, polyoxyethylene-20-sorbitan tristearate, gelatin, ammonium phosphatides, phosphates, diphosphates, polyphosphates, beta-cyclodextrin, cellulose and cellulose derivatives, methyl cellulose, ethyl cellulose, hydroxypropyl cellulose, methylethyl cellulose, fatty acids, salts of fatty acids, monoglycerides, diglycerides, polyglycerol esters of fatty acids, sugar esters of fatty acids, polyglycerol polyricinoleate, and stearyl tartrate. In more preferred embodiments, the stabilizer comprises one or more ingredients selected from the group consisting of alginates, guar gum, sodium phosphates, and potassium phosphates. In even more preferred embodiments, the stabilizer comprises guar gum. In highly preferred embodiments, the stabilizer comprises between 0.2% and 0.45% of the product.

In some embodiments, the product may further comprise one or more binders. In preferred embodiments, the binder comprises one or more ingredients selected from the group consisting of polyesteral, melamine, polyurethane, processed eucheuma seaweed, gum arabic, and cassia gum. In a preferred embodiment the binder comprises between 0.3% and 1.05% of the product.

In some embodiments, the product may further comprise one or more fining agents. In preferred embodiments, the fining agent comprises one or more ingredients selected from the group consisting of bentonite and tensides. In more preferred embodiments, the fining agent comprises bentonite. In highly preferred embodiments, the bentonite comprises between 0.65% and 1.15% of the product.

In preferred embodiments, the product is a transparent liquid. In some embodiments, the product has a slight ammonia odor in liquid form. In preferred embodiments, the product has a boiling point between 95° C. and 105° C. at atmospheric pressure. In highly preferred embodiments, the product has a boiling point between 99° C. and 101° C. at atmospheric pressure. In preferred embodiments, the product has a freezing point between −6° C. and 4° C. at atmospheric pressure. In highly preferred embodiments, the product has a freezing point between −2° C. and 0° C. at atmospheric pressure. In preferred embodiments, the product has a pH between 6.0 and 6.8. In preferred embodiments, the product has a viscosity between 3 mPa·s and 15 mPa·s depending on its concentration.

In preferred embodiments, the product may be stable for long-term storage when stored in a sealed container at temperatures between its freezing point and 35° C.

EXAMPLES

The product may be prepared as a ready-to-use solution or a concentrate. In preferred embodiments, both the ready-to-use solution and the concentrate comprise the following ingredients: water, a flame retardant, a vegetable oil, a dishwashing detergent, vinegar, a sanitizer, and a polymer.

In some preferred embodiments, the ready-to-use solution may preferably comprise ingredients in approximately the following ratios:
(1) 2000 g flame retardant
(2) 26 g vegetable oil
(3) 35 g dishwashing detergent
(4) 7 g distilled vinegar (12% aqueous solution)
(5) 15 g sanitizer
(6) 17 g polymer
(7) 7900 g water The ready-to-use mixture may preferably comprise approximately 20% of the active mixture in water.

In some preferred embodiments, the concentrate may preferably comprise ingredients in approximately the following ratios:
(1) 2000 g flame retardant
(2) 26 g vegetable oil
(3) 35 g dishwashing detergent
(4) 7 g distilled vinegar (12% aqueous solution)
(5) 15 g sanitizer
(6) 17 g polymer
(7) 1348 g water The concentrate may preferably comprise approximately 58% of the active mixture in water. The concentrate may be converted into the ready-to-use solution by diluting with water in a 1.9:1 ratio of water to concentrate.

In some preferred embodiments, the flame retardant may comprise ammonium chloride, one or more nitrogen-containing compounds, one or more organic ammonium phosphates, aluminum phosphate, and sulfates.

Any ordinary vegetable oil may be used. For the preparations described below, corn oil or rapeseed oil was used.

Any ordinary dishwashing detergent may be used. For the preparations described below, the dishwashing detergent used was Grumme Diskmedel by Grumme, which comprises: water, sodium laureth sulfate, trideceth-8, cocamidopropyl betaine, sodium chloride, denatured alcohol, lauramine oxide, propylene glycol, perfume, benzisothiazolinone, potassium hydroxide, CL 19140, and CL 42090.

Any ordinary vinegar may be used. For the preparations described below, Absolut Ren Ättika 12% distilled vinegar aqueous solution by Perstorp Ättika was used.

Any ordinary sanitizer may be used. For the preparations below, the sanitizer used was a preservative, disinfectant sanitizer by Biosphere Innovation which comprises: water, dimethyl ammonium chloride (1-3%), didecyldimethyl ammonium chloride (1-3%), decyldimethyloctyl ammonium chloride (1-3%), and $C_8$-$C_{18}$-alkylbenzyldimethyl ammonium chloride (1-5%).

Any ordinary soluble polymer may be used. For the preparations below, a fluoropolymer product by Fiber ProTector Norge AS comprising 1-5% perfluoroalkyl copolymer, 5-10% acetic acid, and water was used.

Preparation of Ready-to-Use Solution:

The ready-to-use solution may be prepared as described below. 2000 g of the flame retardant is added to a suitable container. The flame retardant should preferably be dry and should preferably have previously been stored at ambient temperature. 6900 g of water is heated to approximately 45° C. in a separate container. The water temperature should not be less than 35° C. or greater than 55° C. The warm water is added to the container containing the flame retardant and the components are mixed with an electronic stirrer until the flame retardant dissolves completely. 26 g of vegetable oil is then added to the solution with electronic stirring and then the mixture is stirred until the vegetable oil dissolves completely. 35 g of dishwashing detergent is then added to the solution with electronic stirring and then the mixture is stirred until the dishwashing detergent dissolves completely. 17 g of the polymer is then added to the solution with electronic stirring and then the mixture is stirred until the polymer dissolves completely. In a separate container, 1000 g of water is combined with 15 g of the sanitizer and 7 g of the 12% aqueous solution of distilled vinegar and the mixture is stirred until the sanitizer and vinegar solution dissolve completely. This solution is then added to the solution comprising the flame retardant, vegetable oil, dishwashing detergent, and polymer and stirred with an electronic stirrer until the solution is uniform.

The solution is then preferably allowed to cool to approximately 15-20° C. without an external cooling source, filtered, and then is poured into plastic containers of suitable size and each container is sealed with an airtight cap.

Excess stirring after components are dissolved may cause undesirable excessive drop in temperature of the solution. The sequence of addition of components minimizes undesired side reactions and promotes long-term stability of the product.

Preparation of Concentrate:

The concentrate is prepared according to a similar procedure as described for the ready-to-use solution. 2000 g of the flame retardant is added to a suitable container. The flame retardant should preferably be dry and should preferably have previously been stored at ambient temperature. 1200 g of water is heated to approximately 65° C. in a separate container. The water temperature should not be less than 55° C. or greater than 75° C. The warm water is added to the container containing the flame retardant and the components are mixed with an electronic stirrer until the flame retardant dissolves completely. 26 g of vegetable oil is then added to the solution with electronic stirring and then the mixture is stirred until the vegetable oil dissolves completely. 35 g of dishwashing detergent is then added to the solution with electronic stirring and then the mixture is stirred until the dishwashing detergent dissolves completely. In a separate container, 148 g of water is combined with 15 g of the sanitizer, 7 g of the 12% aqueous solution of distilled vinegar, and 17 g of the polymer, and the mixture is stirred until the sanitizer, vinegar solution, and polymer dissolve completely. The polymer will take longer to dissolve than during preparation of the ready-to-use solution as the water temperature is lower. Cool the solution comprising the flame retardant, vegetable oil, and dishwashing detergent to below 40° C. without using an external cooling source, but not below 15° C., and then add the solution comprising sanitizer, vinegar solution, and polymer into the larger container containing the main solution comprising the flame retardant, vegetable oil, and dishwashing detergent, and stir with the electronic stirrer until the two solutions are uniformly combined.

The solution is then preferably allowed to cool to approximately 15-20° C. without an external cooling source, filtered, and then is poured into plastic containers of suitable size and each container is sealed with an airtight cap.

Excess stirring after components are dissolved may cause undesirable excessive drop in temperature of the solution. The sequence of addition of components minimizes undesired side reactions and promotes long-term stability of the product.

Laboratory Testing:

The desired properties of an effective flame retardant sought in laboratory testing of flame retardant products include: (1) high stability during use, which would not lead to a high degree of separation of the liquid; (2) no uneven thickening, with different grades of thickening within the product upon contact with the enflamed materials; (3) no harmful chemical reactions between components that would degrade the product during storage or use; (4) stability for long-term storage; and (5) suitability for use on peripheral equipment.

All laboratory tests were conducted at about 20° C. and approximately 40-60% humidity with some additional variance for tests conducted during winter months. All test products were prepared, manufactured, and stored in a laboratory, and were stored and transported in non-transparent plastic containers.

General conclusions from laboratory testing include: (1) temperature and humidity has a significant impact on the effectiveness of the product when used outdoors and (2) small fires are extinguished more easily during winter months or low temperatures. However, small fires are still effectively extinguished in all cases using the proper products.

The following test was carried out in Arbrå Sweden on Jun. 18, 2013 to demonstrate the effectiveness of the flame retardant and fire extinguishing product. Approximately 1.5 L of a blend of 90% gasoline and 10% diesel oil by volume was ignited in an aluminum container and allowed to burn freely for 5 min. About 1 L of the burning liquid remained after 5 min. About 1.8 L of the flame retardant and fire extinguishing product was sprayed onto the burning liquid, and the fire was extinguished in about 40 s. The liquid did not reignite following application of the flame retardant and fire extinguishing product.

Large Scale Testing:

Large scale testing was conducted in conjunction with state- or nation-level authorities and institutions. The product was provided to the testing authority, the tests were conducted by the authority, and the results were obtained and controlled by said authority. Test results were often confirmed using thermal cameras and/or timing devices. General conclusions from large scale testing include: (1) temperature and humidity has a significant impact on the effectiveness of the product and (2) small and medium-sized fires are more easily extinguished than large fires.

The disclosure and examples above are intended as illustrative and are not intended to limit or otherwise restrict the invention. Numerous variations and modifications will become apparent to those skilled in the art upon full appreciation of the above disclosure. For example, one skilled in the art will understand that a variety of different formulations that rely on the same underlying principles used to generate the formulations disclosed above may effect the same results as the disclosed formulations. It is intended that the following claims be interpreted to embrace all such variations and modifications.

All references cited herein are expressly incorporated by reference.

What is claimed is:

1. A method of fighting active fires in liquids comprising applying a product to a liquid, wherein the product comprises a flame retardant comprising ammonium chloride, an organic ammonium phosphate, aluminum phosphate, and an inorganic sulfate.

2. The method of claim 1 wherein the product further comprises water, a polymer, a surfactant, an emulsifier, a preservative, and a firming agent.

3. The method of claim 2 wherein the product is sprayed from a nozzle as an aqueous solution or suspension.

4. The method of claim 2 wherein the product is misted onto the active fire.

5. The method of claim 2 wherein the product binds to the surface layer of the liquid.

6. The method of claim 2 wherein after application the product penetrates into the liquid but does not substantially disperse throughout the liquid.

7. The method of claim 6 wherein the product penetrates into the liquid to a depth of approximately 0.01 to 5 centimeters.

8. The method of claim 2 wherein applying the product prevents ignition or re-ignition of the liquid.

9. The method of claim 8 wherein ignition or re-ignition of the liquid is prevented by the product forming a layer of protection against ignition or re-ignition.

10. The method of claim 2 wherein the liquid is selected from the group consisting of hydrocarbons and polar liquids.

11. The method of claim 2 wherein after application the product provides cooling effects to reduce the temperature of the liquid.

12. The method of claim 11 wherein the cooling effects are provided by increased heat absorption capacity of the liquid.

13. The method of claim 11 wherein the cooling effects are provided by absorption or trapping of hot flammable gases.

14. The method of claim 11 wherein the cooling effects are provided by preventing flammable gases from contacting oxygen.

15. The method of claim 11 wherein the cooling effects are provided by extinguishing an active fire.

16. The method of claim 2 wherein the product is used to create fire breaks.

17. The method of claim 1 wherein the product is used in small firefighting equipment.

18. The method of claim 1 wherein the product is used in light or heavy ground-based firefighting equipment or in aerial firefighting equipment.

19. A method of preventing fires in liquids comprising applying a product to a liquid, wherein the product comprises a flame retardant comprising ammonium chloride, an organic ammonium phosphate, aluminum phosphate, and an inorganic sulfate.

20. The method of claim 19 wherein the product further comprises water, a polymer, a surfactant, an emulsified, a preservative, and a firming agent.

21. The method of claim 20 wherein the liquid is selected from the group consisting of hydrocarbons and polar liquids.

\* \* \* \* \*